US009162720B2

(12) United States Patent
Mistry et al.

(10) Patent No.: US 9,162,720 B2
(45) Date of Patent: Oct. 20, 2015

(54) ROBOT ACTION BASED ON HUMAN DEMONSTRATION

(75) Inventors: Michael Mistry, Pittsburgh, PA (US);
Akihiko Murai, Pittsburgh, PA (US);
Katsu Yamane, Pittsburgh, PA (US);
Jessica Kate Hodgins, Pittsburgh, PA (US)

(73) Assignee: Disney Enterprises, Inc., Burbank, CA (US)

(*) Notice: Subject to any disclaimer, the term of this patent is extended or adjusted under 35 U.S.C. 154(b) by 492 days.

(21) Appl. No.: 13/311,419

(22) Filed: Dec. 5, 2011

(65) Prior Publication Data

US 2012/0143374 A1 Jun. 7, 2012

Related U.S. Application Data

(60) Provisional application No. 61/419,529, filed on Dec. 3, 2010.

(51) Int. Cl.
*G05B 15/02* (2006.01)
*B62D 57/032* (2006.01)

(52) U.S. Cl.
CPC .................... *B62D 57/032* (2013.01)

(58) Field of Classification Search
CPC ..................................................... B62D 57/032
USPC ............................. 700/245, 259; 901/15, 47
See application file for complete search history.

(56) References Cited

U.S. PATENT DOCUMENTS

| | | | | |
|---|---|---|---|---|
| 6,950,534 | B2* | 9/2005 | Cohen et al. | 382/103 |
| 7,606,411 | B2* | 10/2009 | Venetsky et al. | 382/153 |
| 7,859,540 | B2* | 12/2010 | Dariush | 345/474 |
| 8,055,021 | B2* | 11/2011 | Caritu et al. | 382/103 |
| 2003/0034979 | A1* | 2/2003 | Nakamura et al. | 345/474 |
| 2003/0215130 | A1* | 11/2003 | Nakamura et al. | 382/154 |
| 2005/0134592 | A1* | 6/2005 | Rose et al. | 345/474 |
| 2005/0209535 | A1* | 9/2005 | Dariush | 600/595 |
| 2005/0209536 | A1* | 9/2005 | Dariush | 600/595 |
| 2006/0013440 | A1* | 1/2006 | Cohen et al. | 382/103 |
| 2007/0255454 | A1* | 11/2007 | Dariush | 700/245 |
| 2008/0278497 | A1* | 11/2008 | Jammes et al. | 345/474 |
| 2008/0285805 | A1* | 11/2008 | Luinge et al. | 382/107 |
| 2010/0057255 | A1* | 3/2010 | Ra et al. | 700/253 |

(Continued)

OTHER PUBLICATIONS

M. Mistry, S. Schaal, and K. Yamane; "Inertial parameter estimation of floating base humanoid systems using partial force sensing." 9th IEEE-RAS International conference on Humanoid Robots, 2009.

(Continued)

*Primary Examiner* — Thomas G Black
*Assistant Examiner* — Wae Louie
(74) *Attorney, Agent, or Firm* — Patterson & Sheridan, LLP

(57) ABSTRACT

Embodiments of the invention provide an approach for reproducing a human action with a robot. The approach includes receiving data representing motions and contact forces of the human as the human performs the action. The approach further includes approximating, based on the motions and contact forces data, the center of mass (CoM) trajectory of the human in performing the action. Finally, the approach includes generating a planned robot action for emulating the designated action by solving an inverse kinematics problem having the approximated human CoM trajectory as a hard constraint and the motion capture data as a soft constraint.

25 Claims, 6 Drawing Sheets

(56) References Cited

U.S. PATENT DOCUMENTS

| | | | |
|---|---|---|---|
| 2011/0054870 A1* | 3/2011 | Dariush et al. | 703/11 |
| 2011/0066283 A1* | 3/2011 | Hammam et al. | 700/250 |
| 2012/0143374 A1* | 6/2012 | Mistry et al. | 700/259 |

OTHER PUBLICATIONS

T. Sugihara and Y. Nakamura; "Whole-body cooperative balancing of humanoid robot using cog jacobian"; 2002 IEEE/RSJ International Conference on Intelligent Robots and Systems, pp. 2575-2580, 2002.

C. Ott, D. Lee, and Y. Nakamura; "Motion capture based human motion recognition and imitation by direct marker control"; IEEE-RAS International Conference on Humanoid Robots 2008, pp. 399-405.

J. P. Scholz and G. Schoner; "The uncontrolled manifold concept: identifying control variables for a functional task"; Exp Brain Res. vol. 126, No. 3, pp. 289-306, Jun. 1999.

A. Murai, K. Yamane, and Y. Nakamura; "Modeling and identifying the somatic reflex network of the human neuromuscular system"; Proceedings of the 29th IEEE EMBS Annual International Conference, Lyon, France, 2007.

K. Yamane and Y. Nakamura; "Natural motion animation through constraining and deconstraining at will"; IEEE Transaction on Visualization and Computer Graphics, vol. 9, pp. 352-360, 2003.

E. Papa and A. Cappozzo; "Sit-to-stand motor strategies investigated in able-bodied young and elderly subjects"; J. Biomechanics, vol. 33, No. 9, pp. 1113-1122, 2000.

C. Atkeson, C. An, and J. Hollerbach, "Estimation of inertial parameters of manipulator loads and links"; The International Journal of robotics Research, Han. 1986.

K. Ayusawa, G. Venture, and Y. Nakamura, "Identification of the inertial parameters of a humanoid robot using unactuated dynamics of the base link": 8th IEEE-RAS International Conference on Humanoid Robots, pp. 1-7, Nov. 2008.

M. Mistry, J. Buchli, and S. Schaal; "Inverse dynamics control of floating base systems using orthogonal decomposition"; Proceeding of the 2010 IEEE Int. Conference on Robotics and Automation, 2010.

Y. Nakamura, K. Yamane, and A. Murai; "Macroscopic Modeling and Identification of the Human Neuromuscular Network"; Proceedings of the 28th IEEE EMBS Annual International Conference, New York City, NY, USA, Aug. 30-Sep. 3, 2006.

* cited by examiner

ROBOT ACTION BASED ON HUMAN DEMONSTRATION

CROSS REFERENCE TO RELATED APPLICATIONS

This application claims benefit of U.S. Provisional Patent Application Ser. No. 61/419,529 filed Dec. 3, 2010, which is incorporated herein by reference in its entirety.

BACKGROUND

1. Field

Embodiments presented in this disclosure generally relate to robotics. More specifically, embodiments pertain to techniques for determining robot actions based on human demonstrations.

2. Description of the Related Art

Anthropomorphic actions are a prominent feature of some robots, including humanoid robots. Such actions may include walking, running, etc. For example, theme park humanoid robots have been designed that are capable of standing up from a seated position and greeting park visitors. Typically however, such standing humanoid robots will fall over unless their feet are bolted to the floor. Likewise, humanoid robots tasked with performing other actions, including various upper-body movements, may lose their balance unless bolted to the floor. As a result, such humanoid robots either cannot be made to perform certain actions because they will lose balance, or the humanoid robots must be bolted to the floor to maintain balance while performing the actions.

Merely recording and playing back the actions of a human demonstrator, such as a sit-to-stand action of the human demonstrator, will generally not work because the human and the humanoid robot often have different kinematic and dynamic properties. As a result, the humanoid robot is likely to lose balance when repeating the action of the human demonstrator. Further, although humans rely on precise CoM control to stand, the actual center of mass (CoM) of the human demonstrator in performing a sit-to-stand action is not directly measurable and can therefore be difficult to determine. Finally, accurate dynamics properties of the humanoid robot can be unknown and difficult to directly measure and determine.

SUMMARY

Embodiments of the invention provide an approach for reproducing a human action with a robot. The approach includes receiving motion capture data and contact force data obtained from a human performing the action. The approach further includes approximating, based on the motions and contact forces data, the center of mass (CoM) trajectory of the human in performing the action. Finally, the approach includes generating a planned robot action for emulating the designated action, where generating the planned robot action includes solving an inverse kinematics problem having the approximated human CoM trajectory and the motion capture data as constraints.

Other embodiments include, without limitation, a computer-readable medium that includes instructions that enable a processing unit to implement one or more aspects of the disclosed approaches as well as a system configured to implement one or more aspects of the disclosed approaches.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
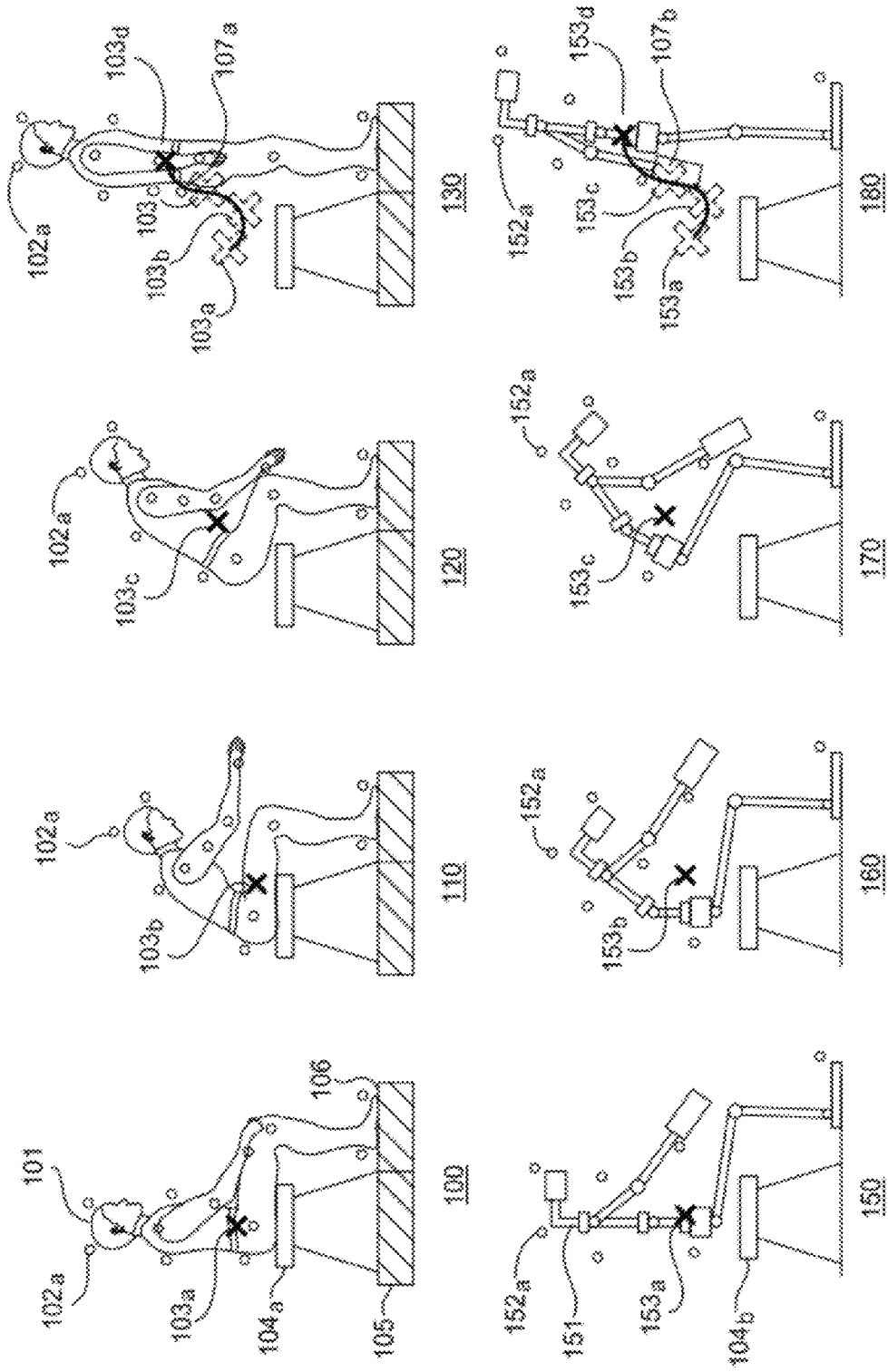
FIG. 1 depicts a human demonstration of a standing action and a corresponding humanoid robot standing action based on the human demonstration, according to one embodiment of the invention.

Embodiments presented herein provide techniques that enable a humanoid robot to successfully perform a sit-to-stand action. That is, embodiments presented herein allow a humanoid robot to stand up from a seated posture. Further, the approaches provided herein enable the humanoid robot to emulate natural human-like movement and speed, giving the robot a more human-like appearance in performing the sit-to-stand action.

In one embodiment, motion capture techniques may be used to record demonstrations from human subjects standing up naturally as well as actors performing stylized motions. Because the dynamics of these motions play a significant role in realizing the sit-to-stand action, contact forces from the human demonstrators may be recorded as well. This contact force information, along with a skeletal model, allows the CoM trajectory of a human demonstrator performing the sit-to-stand motion to be approximated. The CoM trajectory generally tracks a path of the CoM through a sagittal plane of the human demonstrator. Maintaining a consistent CoM trajectory provides an important control component of performing a sit-to-stand motion. Therefore, the robot may be configured to not only emulate the motions of the human demonstrator, but also to emulate the CoM trajectory of the human demonstrator.

Emulating the CoM trajectory of the human demonstrator requires an estimate of the inertial parameters of the robot, from which the CoM of the robot is readily determinable. In one embodiment, an inertial parameter estimation technique is used to identify the mass and center of mass parameters of a 5-link planar robot model. That is, the 5-link planar robot model may be used to estimate inertial parameters of the robot, from which the CoM trajectory of the robot is readily determinable.

Note, the discussion below generally uses a sit-to-stand action as an example of a complex motion that moves the center of mass of a humanoid robot from one support position (seated) to another (standing). Of course, one of ordinary skill in the art will recognize that the techniques for configuring a robot to emulate a sit-to-stand motion by emulating a center of mass trajectory may readily be adapted to model and perform other actions and motions, including other motions under contact condition changes.

Additionally, the following description references embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device. The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

FIG. 1 depicts a human demonstration of a standing action and a corresponding humanoid robot standing action based on the human demonstration, according to one embodiment of the invention. As shown, the human demonstrator 101 begins in a seated position 100 on a chair 104a. In the seated position 100, the CoM 103a of the human demonstrator 101 is above the chair 104a. Markers 102a on the human demonstrator 101 record the motions of the human demonstrator 101 while performing the standing action. As shown, markers 102a are placed near the joints of the human demonstrator and at other positions along the surface of the demonstrator. Further, two force sensor plates 105 and 106 are placed under the chair 104a and the feet of the human demonstrator 101, respectively. In one embodiment, the two force sensor plates 105 and 106 may be six-axis force sensors that measure forces in six orthogonal directions. Although depicted as two force sensors, more or fewer force sensors may be used. In one embodiment, one force sensor may be placed under each foot of the human demonstrator 101, and an additional force sensor may be placed under the chair 104a.

As the human demonstrator 101 stands at 110 and 120, respectively, the CoM 103a of the human demonstrator 101 lowers slightly to 103b, then rises to 103c. In the standing position at 130, the CoM 103a of the human demonstrator 101 is at 103d, directly above the feet of the human demonstrator 101. During the standing action, the markers 102a are used to record the motions of the human demonstrator 101, including the motions of the legs, arms, head, etc. of the human demonstrator 101.

In one embodiment, data recorded by the force plates 105-106 and the markers 102a may be used to estimate the CoM 103a-d of the human demonstrator 101 during the sit-to-stand action. For example, a computer may store a human skeletal model with the proportions of an average human for use in approximating the CoM trajectory of the human demonstrator. For example, the CoM trajectory may be estimated using the motion capture and force contact data obtained from the human demonstrator. In such a case, the computer first computes a center of pressure (CoP) trajectory of the human demonstrator during the action based on the contact forces measured via the force plates 105-106. As is known, the CoP generally corresponds to a point at which the sum of the pressure field acts, causing a force and no moment at the point. The computer then maps the positions of the markers 102a to the human skeletal model and uses the mapping to simulate the action, with the skeletal model following the mapped positions of the markers. Based on the simulation, the computer determines a CoP trajectory of the human skeletal model during the simulated action. In some embodiments, the CoP trajectory may be determined by using a set of known inertial parameters of the human skeletal model.

The resulting CoP trajectory may be displayed to a user. If the computed CoP trajectory for the human skeletal model during the simulated action does not match the computed CoP trajectory for the human demonstrator during the actual action (within a specified error tolerance), then the user may manually scale the lengths and masses of the links of the human skeletal model. After the lengths and masses of the links have been scaled, the computer may perform the simulation, determine the CoP trajectory of the human skeletal model again, and display these results to the user. The simulated action, CoP trajectory computation, and manual scaling of the lengths and masses of the links of the human skeletal model may be repeated until the simulated CoP trajectory for the human skeletal model during the simulated action matches, up to a specified error tolerance, the computed CoP trajectory for the human demonstrator during the actual action. Then, the computer may determine, based on the known inertial parameters of the human skeletal model, a CoM trajectory for the human skeletal model during the simulated action. The CoM trajectory may be taken as the approximation or estimate CoM of the human demonstrator 101 in performing the sit-to-stand action. In an alternative embodiment, a computer may be programmed to scale the lengths and masses of the links of the human skeletal model and to perform the simulated action, CoP trajectory computation, and scaling of links of the human skeletal model in a loop until the simulated CoP trajectory for the human skeletal model during the simulated action matches, up to a specified error tolerance, the computed CoP trajectory for the human demonstrator during the actual action.

As shown in FIG. 1, a humanoid robot 151 standing action based on the human demonstration begins with the humanoid robot 151 seated on a chair 104*b*. Illustratively, the humanoid robot 151 is a robot with a head, a torso, two arms, and two legs. The humanoid robot 151 is capable of being placed in a seated position 150. In the seated position 150, the CoM 153*a* of the humanoid robot 151 is above the chair 104*b*. The CoM 153*a* of the seated humanoid robot 151 need not be the same as the CoM 103*a* of the seated human demonstrator 101 at 100. That is, the CoM 153*a* of the seated humanoid robot 151 may be different from the CoM 103*a* of the seated human demonstrator 101 where, for example, the robot is taller than the human demonstrator. Like the human demonstrator 101, the humanoid robot 151 stands by lowering its CoM to 153*b* and raising its CoM to 153*c* and 153*d* at 160 and 170, respectively. When the humanoid robot is fully standing at 180, the position 153*d* of the CoM of the humanoid robot 151 is directly above the feet of the humanoid robot 151.

As shown in panels 130 and 180, the CoM trajectory 107*a* of the human demonstrator 101 and the CoM trajectory 107*b* of the humanoid robot 151 are identical trajectories up to an error tolerance (not illustrated). The identity of the CoM trajectory 107*a* of the human demonstrator 101 and the CoM trajectory 107*b* of the humanoid robot 151 allows the humanoid robot 151 to maintain balance while performing the sit-to-stand action. That is, when the humanoid robot 151 emulates the action performed by the human demonstrator 101, the humanoid robot 151 adheres to the CoM trajectory 107*a* of the human demonstrator 101 so as not to fall over. In contrast, the marker positions 102(*a*) of the human demonstrator 101 and the marker positions 152*a* of the humanoid robot 151 more loosely correspond, so that the sit-to-stand motion of the humanoid robot 151 roughly emulates the head, arm, leg, body, etc. motions of the human demonstrator 101 during the sit-to-stand action. That is, alignment of marker positions 152*a* is satisfied as best as possible given the "hard constraint" of essentially identical CoM trajectories.

Figure 2:
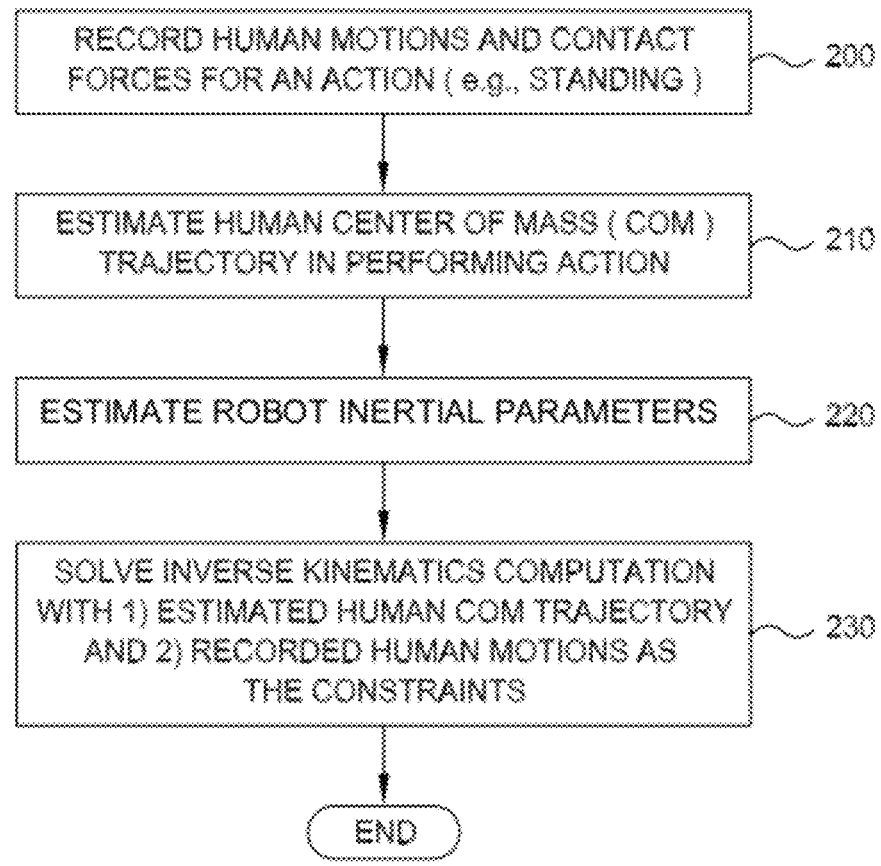
FIG. 2 is a flow diagram illustrating an approach for determining kinematics such that the CoM and movements of the humanoid robot track the CoM and movements of the human while performing the action, according to one embodiment of the invention.

FIG. 2 is a flow diagram illustrating an approach for determining a trajectory of robot joint angles such that the CoM of the humanoid robot 151 and the movements of the humanoid robot 151 track the CoM and movements of the human demonstrator 101 while performing an action, according to one embodiment of the invention. Although the steps are described in conjunction with FIG. 1, persons skilled in the art will understand that any system configured to perform the steps, in any order, falls within the scope of the present invention.

At step 200, a set of video cameras and a set of force sensor plates record the motions and contact forces of a human demonstrating an action, e.g., a sit-to-stand action. The video cameras are configured to record the positions of a set of markers placed on the human demonstrator 101, either continuously or at predefined time intervals, as the human demonstrator 101 performs the action. Further, a three-dimensional position of a set of markers on the person can be tracked during the video recording. That is, the motion of the human demonstrator 101 during the action is measured empirically as a set of 3D marker trajectories $m(t) \in \mathbb{R}^{3n_m}$, where $n_m$ is the number of markers. In some embodiments, the set of markers may include markers that are inertial, magnetic, reflective, light-emitting diode (LED), etc., or a combination of these types of markers. Further, in some embodiments, the set of markers may be placed near the joints of the human demonstrator 101.

The force sensor plates include six-axis force sensors capable of measuring forces along six orthogonal axes, either continuously or at predefined time intervals, as the human demonstrator 101 performs the action. The action may include a sit-to-stand action. In such a case, a first force sensor plate 105 is placed under the feet of the human demonstrator 101 and a second force sensor plate 106 is placed under the object the human demonstrator 101 is initially seated on. In an alternative embodiment, one force sensor plate could be placed under each foot of the human demonstrator 101, and one additional force sensor plate could be placed under the object the human demonstrator 101 is initially seated on. Generally, as the human demonstrator 101 stands from the seated position 100, the weight of the human demonstrator 101 is shifted to the feet of the human demonstrator 101, thereby increasing the forces exerted on the force sensor plate 105 under the feet of the human demonstrator 101 and reducing the forces exerted on the force sensor plate 106 under the object the human demonstrator 101 is initially seated on.

At step 210, the motion and ground contact forces recorded at step 200 are used to estimate the CoM trajectory of the human demonstrator, giving $p_{CoMsim}(t) \in \mathbb{R}^3$ during the action. In one embodiment, a computer may store a human skeletal model for estimating the CoM trajectory of the human demonstrator $p_{CoMsim}(t)$. In such a case, the computer first determines a CoP trajectory of the human demonstrator $P_{CoPexp}(t) \in \mathbb{R}^2$ during the action based on the six-axis contact forces recorded at step 200.

Once the CoP trajectory of the human demonstrator $p_{CoMsim}(t)$ is determined, the computer then maps the positions of the markers recorded at step 200 to the human skeletal model. Based on known inertial parameters of the human skeletal model and a simulated action of the human skeletal model as it follows the mapped positions of the markers, the computer may then determine a simulated CoP trajectory of the human skeletal model $p_{CoPsim}(t) \in \mathbb{R}^2$ during the simulated action. A simulated CoP trajectory may then be used to determine a simulated CoM trajectory of the human skeletal model. Because the actual human CoM trajectory during the action is difficult to determine, the simulated CoM trajectory of the human skeletal model may be used as a proxy for the actual human CoM trajectory. While emulating the action performed by the human demonstrator 101, the CoM of the humanoid robot 151 may then be matched to the simulated CoM trajectory of the human skeletal model, thereby allowing the humanoid robot 151 to maintain balance.

In one embodiment, the computer displays the simulated CoP trajectory of the human skeletal model $p_{CoPsim}(t)$ to a user. As noted above, if the simulated CoP trajectory of the human skeletal model $p_{CoPsim}(t)$ does not match the computed CoP trajectory for the human demonstrator $p_{CoPexp}(t)$ during the actual action, then the user can manually scale the lengths and masses of the links of the human skeletal model and run the simulated action and CoP trajectory computation again. The simulated CoP trajectory for the human skeletal model $p_{CoPsim}(t)$ is re-computed, and the user manually scales the lengths and masses of the links of the human skeletal model again, until the simulated CoP trajectory for the human skeletal model $p_{CoPsim}(t)$ matches, up to the predefined error tolerance, the computed CoP trajectory of the human demonstrator $p_{CoPexp}(t)$ during the actual action. In one embodiment, the human skeletal model initially includes the proportions of an average human before the user manually scales the human skeletal model. Further, in one embodiment, a computer may be programmed to scale the lengths and masses of the links of the human skeletal model and to perform the simulated action, computation of the simulated CoP trajectory of the human skeletal model $p_{CoPsim}(t)$, and scaling of the links of the human skeletal model, in a loop until the simulated CoP trajectory of the human skeletal model $p_{CoPsim}(t)$ during the simulated action matches, up to the predefined error tolerance, the computed CoP trajectory for the human demonstrator $p_{CoPexp}(t)$.

Once the simulated CoP trajectory for the human skeletal model $p_{CoPsim}(t)$ matches the computed CoP trajectory of the human demonstrator $p_{CoPexp}(t)$ during the actual action up to the predefined error tolerance, the computer determines, based on the known inertial parameters of the human skeletal model, a CoM trajectory for the human skeletal model $p_{CoMsim}(t) \in \mathbb{R}^3$ during the simulated action. The CoM trajectory for the human skeletal model $p_{CoMsim}(t)$ provides an estimated CoM trajectory of the human demonstrator during the action. In alternative embodiments, other approximations of the human CoM trajectory may be used. For example, an estimated trajectory of the pelvis of the human while performing the action may be used as the approximate human CoM trajectory.

At step 220, inertial parameters of the humanoid robot 151 are estimated using a simplified version of a traditional least-squares optimization inertial parameter identification technique. As noted above, the CoM of the humanoid robot 151 may be determined from the inertial parameters. To simplify the traditional least-square optimization inertial parameter identification technique, only inertial parameters relevant to the action are estimated. For example, in a human sit-to-stand action, the CoM of the human remains in the sagittal plane of the human, bisecting the human from front to rear so as to divide the human into left and right parts. In such a case, a reduced 2D model representing the humanoid robot 151 in the sagittal plane may be used in lieu of a full 3D model representing the entire humanoid robot. In one embodiment, the arms of the humanoid robot 151 are not represented in the reduced 2D model. Doing so simplifies the CoM calculations, without unreasonably affecting accuracy. This occurs as the arm positions of a person performing the sit-to-stand motion does not typically "pull" the CoM of that person significantly in any direction. The reduced 2D model has fewer links than a full 3D model. Therefore, fewer inertial parameters, namely only those inertial parameters associated with the links in the reduced 2D model, need to be estimated.

In one embodiment, the action is a sit-to-stand action. The relevant inertial parameters may be based on a projection of the links of the humanoid robot onto a sagittal plane of the humanoid robot. In such a case, the arms of the humanoid robot may be discarded, and the CoM estimation may be based on a 5-link model with the following four degrees of freedom: ankle, knee, hip, and torso. That is, the inertial parameters for the humanoid robot are reduced to the inertial parameters for the five links, giving a total of fifteen inertial parameters representing the masses, x positions and y positions of the five links.

In one embodiment, the humanoid 151 robot is placed on a set of force sensor plates in a variety of predefined static positions (e.g., standing and squatting positions). Measurements of forces exerted while the humanoid robot undertakes the predefined static positions provide part of an experimental data set for estimating the inertial parameters of the links of the robot. In such a case, the force sensor plates may measure six-axis contact forces exerted by the humanoid robot 151 in the predefined static positions. Separately, load cells in the humanoid robot itself may measure the torques experienced by the joints of the humanoid robot. The joint torques provide another part of the experimental data set for estimating the inertial parameters of links of the robot. In particular, the joint torques and six-axis contact forces measurements provide values for parameters on the right-hand side of the following weighted least-squares optimization equation:

$$\hat{\phi}_g = (\bar{K}_g^T \bar{K}_g)^{-1} \bar{K}_g^T \bar{f} \quad (1)$$

where $\hat{\phi}_g$ represents a vector of inertial parameters, and the inertial parameters of each link of the reduced model can be represented as $\phi_g = [m_i \ m_i c_{x_i} \ m_i c_{y_i} \ m_i c_{z_i}]^T$; $\bar{K}_g$ represents an augmented stack of kinematics matrices $K_g(q)$, with $q \in \mathbb{R}^{n+6}$ being the robot configuration vector for a robot with n joints and a six degree-of-freedom floating base; and $\bar{f}$ represents the following augmented stack of matrices:

$$\bar{f} = \begin{bmatrix} S^T \tau_1 + J_{C_1}^T \lambda_1 \\ S^T \tau_2 + J_{C_2}^T \lambda_2 \\ \vdots \\ S^T \tau_N + J_{C_N}^T \lambda_N \end{bmatrix} \quad (2)$$

where $S^T = [0_{n \times 6} \ I_{n \times n}]$ delineates the actuated and unactuated degrees of freedom, $J_{C_N}^T$ is the contact Jacobian for the Nth data set, $\tau_N \in \mathbb{R}^n$ is the vector of actuation torques for the Nth data set, and $\lambda_N$ is the vector of contact forces for the Nth data set. Finally, an estimate of the total CoM of the humanoid robot may be obtained via forward kinematics based on the masses and relative CoM locations of each link, which may be computed from the inertial parameters.

At step 230, a motion for the humanoid robot 151 is determined via inverse kinematics using the human CoM trajectory $p_{CoMsim}(t)$ approximated at step 210 as a "hard constraint" and the human motions recorded at step 200 as a "soft constraint." Inverse kinematics calculates joint angles necessary to achieve desired positions. In the present context, the joint angle trajectories calculated via inverse kinematics are constrained so as to strictly maintain the human CoM trajectory $p_{CoMsim}(t)$ (i.e., using the human CoM trajectory $p_{CoMsim}(t)$ as a "hard constraint") to keep balance, while also respect the recorded marker trajectories as best as possible (i.e., using the recorder marker trajectories as a "soft constraint") to emulate human motions.

In one embodiment, calculating the joint angle trajectories via inverse kinematics includes experimentally measuring the joint angles of the humanoid robot in a sitting posture. Then, a corresponding frame from the human demonstration recorded at step 200 is selected and marker positions from the frame are overlaid onto the posture of the humanoid robot. The relative position between each marker and the corresponding link of the humanoid robot is chosen as the marker position set for the humanoid robot. As clear to persons skilled in the art, the Jacobian matrix of CoM with respect to the joint angles $J_{CoM}(\theta_r) \in \mathbb{R}^{3 \times n_{jr}}$ and the Jacobian matrix of the marker positions with respect to the joint angle $J_{CoM}(\theta_r) \in \mathbb{R}^{3n_m \times n_{jr}}$, where $n_{jr}$ is the number of degrees of freedom of the humanoid robot, can be obtained from the inertial parameters of the humanoid robot and the marker position set for the humanoid robot. Using the Jacobian matrices $J_{CoM}(\theta_r)$ and $J_m(\theta_r)$, the inverse kinematics problem for determining humanoid robot joint angles can be solved via an iterative technique, such as a gradient descent algorithm, with the CoM trajectory of the human skeletal model $p_{CoMsim}(t)$ calculated at step 210 as a hard constraint and the marker trajectories m(t) recorded at step 200 as a soft constraint. That is, the computer determines the trajectory of the humanoid robot joint angles $\theta_r(t) \in \mathbb{R}^{n_{jr}}$ iteratively so as to satisfy CoM trajectory of the human skeletal model $p_{CoMsim}(t)$ as a hard constraint and the marker trajectories m(t) as a soft constraint. In one embodiment, marker trajectories m(t) may be used as a soft constraint according to the technique proposed in K. Yamane and Y. Nakamura, "Natural motion animation through constraining and deconstraining at will," *IEEE Transaction on Visualization and Computer Graphics*, vol. 9, pp. 352-360, 2003 incorporated by reference in its entirety. The resulting joint angle trajectories maintain the desired CoM trajectory to keep balance while respecting the measured marker trajectories as a soft constraint to emulate the motions of the human demonstrator 101.

Although embodiments described above use the human CoM and marker trajectories as constraints, alternative embodiments may use other constraints. For example, smoothness, energy efficiency, torques, and collision avoidance, among others may be used as additional constraints, thereby generalizing the applicability of the approaches described herein across a variety of constraints.

Figure 3:
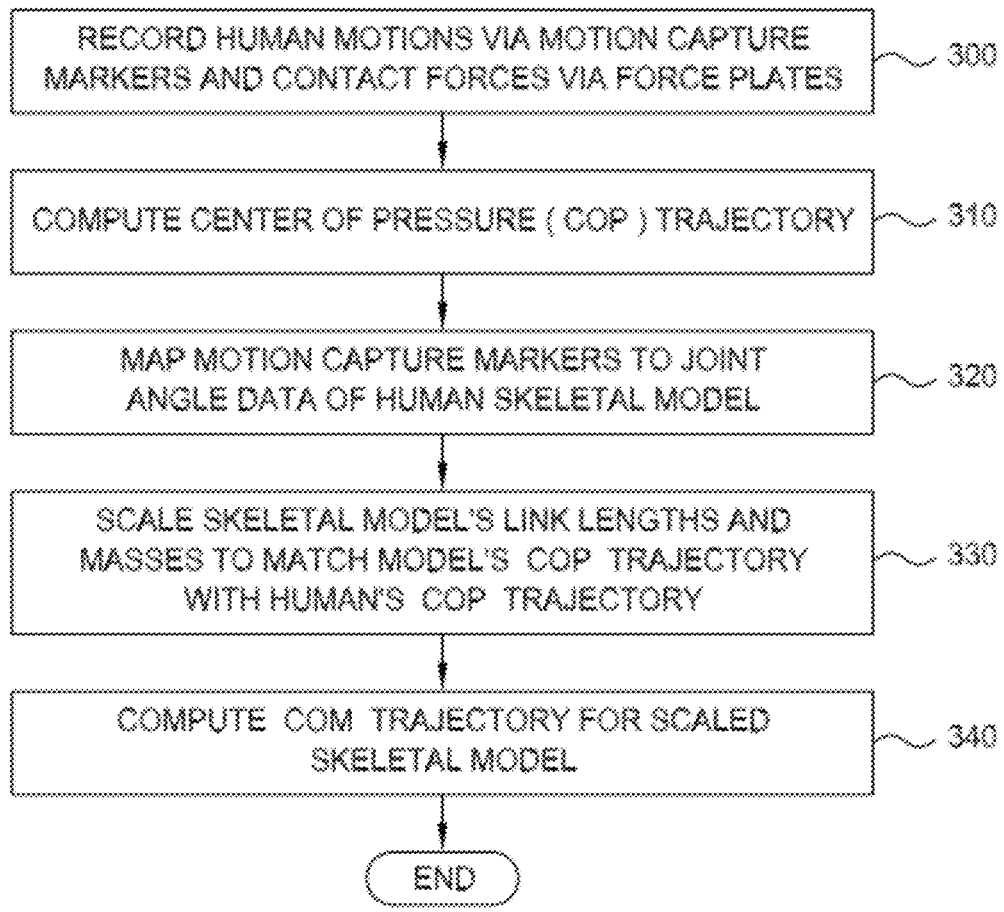
FIG. 3 is a flow diagram illustrating one embodiment of an approach for estimating the CoM trajectory of the human demonstrator performing the action.

FIG. 3 is a flow diagram of steps for using a human CoM trajectory during an action at step 210 of FIG. 2 to obtain an approximated human CoM, according to one embodiment of the invention. Persons skilled in the art will understand that any system configured to perform the steps, in any order, falls within the scope of the present invention.

As shown, the method begins at step 300, where a set of video cameras and a set of force sensor plates record the motions and ground contact forces, respectively, of a human demonstration 101 of an action, as described above for step 200 of the approach shown in FIG. 2. The video cameras are configured to record the positions of a set of markers placed on the human demonstrator 101, either continuously or at predefined time intervals, as the human demonstrator performs the action. That is, the motion of the human demonstrator 101 during the action is measured experimentally as a set of 3D marker trajectories $m(t) \in \mathbb{R}^{3n_m}$, where $n_m$ is the number of markers. In one embodiment, the action includes a sit-to-stand action and a first force sensor plate is placed under the feet of the human demonstrator 101 and a second force sensor plate is placed under the object the human demonstrator 101 is initially seated on. In a further embodiment in which the action includes a sit-to-stand action, one force sensor plate is placed under each foot of the human demonstrator 101, and an additional force sensor plate is placed under the object the human demonstrator 101 is initially seated on.

At step 310, a computer determines a CoP trajectory of the human demonstrator $p_{CoPexp}(t) \in \mathbb{R}^2$ during the action, based on the contact forces recorded at step 300. The computer may determine the CoP trajectory in any feasible manner, including, but not limited to, calculating CoP values at predefined time intervals of the action.

At step 320, the computer maps the positions of the markers in the marker trajectories m(t) recorded at step 200 to the human skeletal model. The computer determines, based on known inertial parameters of the human skeletal model and a simulated action of the human skeletal model as it follows the marker trajectories m(t), a simulated CoP trajectory of the human skeletal model $p_{CoPsim}(t) \in \mathbb{R}^2$ during the simulated action. The computer displays the simulated CoP trajectory of the human skeletal model $p_{CoPsim}(t)$ to a user.

At step 330, the user scales the link lengths and masses of the skeletal model such that the simulated CoP trajectory of the skeletal model $p_{CoPsim}(t)$ matches, up to a predefined error tolerance, the computed CoP trajectory of the human demonstrator $p_{CoPexp}(t)$ during the actual action. When the simulated CoP trajectory for the human skeletal model $p_{CoPsim}(t)$ during the simulated action does not match, up to the predefined error tolerance, the computed CoP trajectory for the human demonstrator $p_{CoPexp}(t)$ during the actual action, then the user manually adjusts the lengths and masses of the links of the human skeletal model. The user then re-runs the simulated action and the computation of the simulated CoP trajectory of the human skeletal model $p_{CoPsim}(t)$. The user may adjust the lengths and masses of the links of the human skeletal model and re-run the simulated action and computation of the simulated CoP trajectory of the human skeletal model $p_{CoPsim}(t)$ until the simulated CoP trajectory of the human skeletal model $p_{CoPsim}(t)$ during the simulated action matches, up to the predefined error tolerance, the computed CoP trajectory for the human demonstrator $p_{CoPexp}(t)$. In an alternative embodiment, a computer may be programmed to scale the lengths and masses of the links of the human skeletal model and to perform the simulated action, computation of the simulated CoP trajectory of the human skeletal model $p_{CoPsim}(t)$, and scaling of the links of the human skeletal model, in a loop until the simulated CoP trajectory of the human skeletal model $p_{CoPsim}(t)$ during the simulated action matches, up to the predefined error tolerance, the computed CoP trajectory for the human demonstrator $P_{CoPexp}(t)$.

The simulation program may generally assume, at step 340, that the simulated CoP trajectory of the human skeletal model $p_{CoPsim}(t)$ matches the computed CoP trajectory for the human demonstrator $p_{CoPexp}(t)$ during the actual action up to the predefined error tolerance. Given such an assumption, the computer determines, at step 340, a simulated CoM trajectory for the human skeletal model $p_{CoMsim}(t) \in \mathbb{R}^3$ during the simulated action based on known inertial parameters of the human skeletal model. Then, the CoM trajectory for the human skeletal model $p_{CoMsim}(t)$ may be taken as the estimated CoM trajectory of the human demonstrator 101 during the action.

Figure 4:
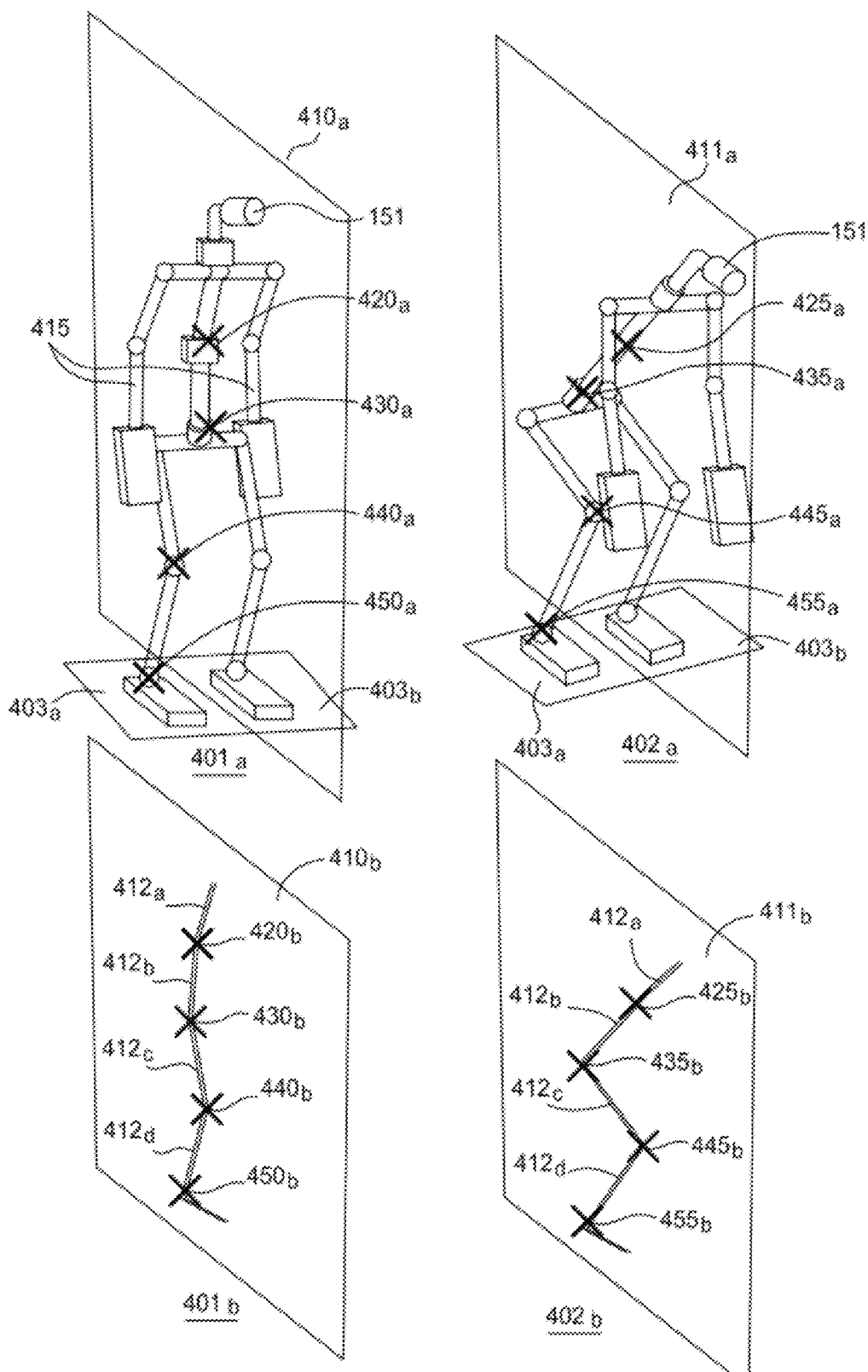
FIG. 4 depicts a humanoid robot placed in various static positions in order to determine contact forces and joint torques and a reduced 2D model used to estimate inertial parameters of the humanoid robot, according to one embodiment of the invention.

FIG. 4 depicts placing a humanoid robot 151 in various static positions in order to determine contact forces and torques, and using a reduced 2D model to estimate the inertial parameters of the humanoid robot 151, according to one embodiment of the invention. As shown, the humanoid robot 151 is standing in 401*a* and squatting in 402*a*. In alternative embodiments, the humanoid robot 151 may be placed in static positions other than the two static positions depicted in FIG. 4.

Sagittal planes 410a and 411 bisect the humanoid robot 151 from front to rear, dividing the humanoid robot 151 into left and right parts. When a human performs certain actions, such as a sit-to-stand action, the CoM of the human moves in the sagittal plane of the human. In such cases, a reduced 2D model of the humanoid robot 151 may be used instead of a full model of the humanoid robot 151. FIG. 4 shows a reduced 2D model that includes five links 412a-e and four degrees of freedom, namely torso 420b, hip 430b, knee, 440b, and ankle 450b, which map to the torso 420a, hip 430a, knees 440a, and ankles 450a of the humanoid robot 151. The five links 412a-e lie on sagittal planes 410b and 411b, which correspond to sagittal planes 410a and 411a of the humanoid robot 151. Further, the arms 415 of the humanoid robot 151 are not modeled in the reduced 2D model.

As shown in FIG. 4, the right and left feet of the humanoid robot 151 step on force contact plates 403a and 403b, respectively. The force sensor plates measure six-axis contact forces exerted by the humanoid robot 151 in the static positions at 401a and 402a. A computer reads and stores the forces and moments on the force contact plates 403a-b for each humanoid robot posture 401a and 402b. The computer further reads and stores data from load cells within the humanoid robot 151 indicating the torques experienced by the joints 420a, 430a, 440a, and 450a of the humanoid robot 151 at 401a, and by joints 425a, 435a, 445a, and 455a of the humanoid robot 151 at 402a. Once recorded, the computer performs least-squares optimization of the inertial parameters using the stored contact forces and joint torques data. In addition, the computer determines relative masses and CoM locations of each link 412a-e based on the inertial parameters. Finally, the computer may estimate the total CoM of the humanoid robot 151 via forward kinematics using the masses and relative CoM locations of each link 412a-e.

Figure 5:
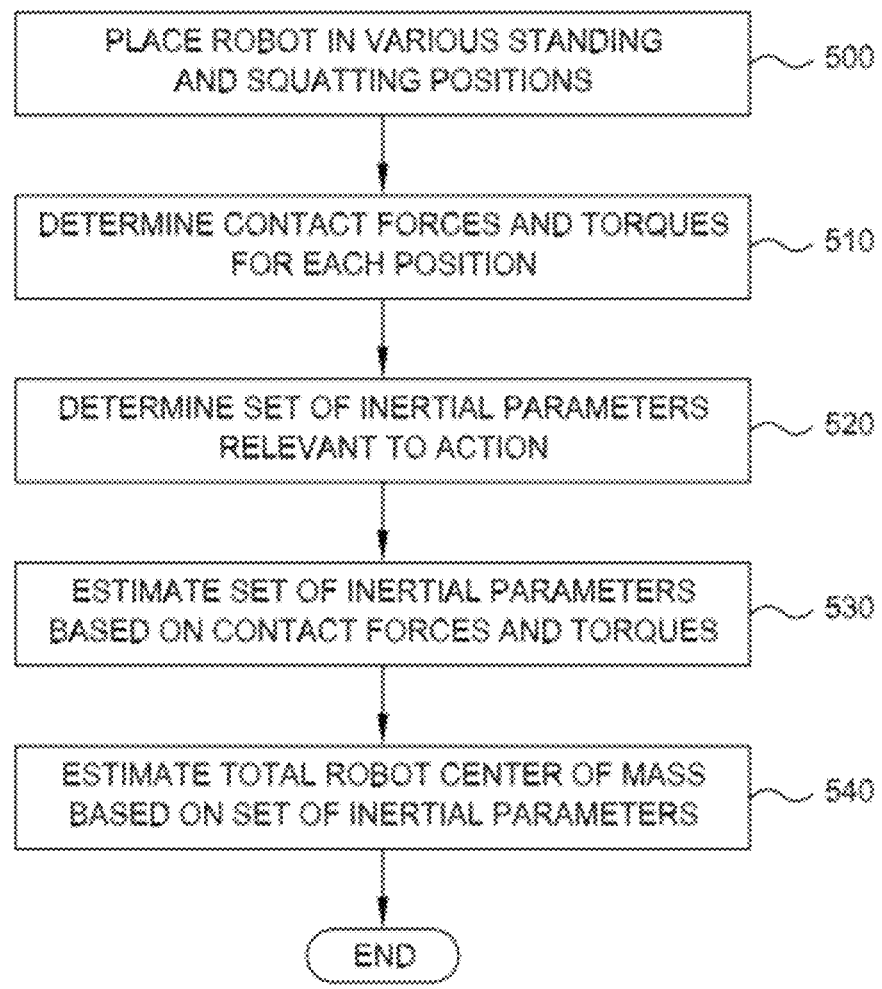
FIG. 5 is a flow diagram illustrating steps for estimating inertial parameters, used to determine an estimated CoM of a humanoid robot, according to one embodiment of the invention.

FIG. 5 is a flow diagram of steps for estimating a humanoid robot CoM, from the inertial parameters estimated at step 220 of FIG. 2, according to one embodiment of the invention. As previously described herein, the CoM of the humanoid robot 151, estimated based on the inertial parameters, is matched to the estimated CoM trajectory of the human demonstrator 101 so that the humanoid robot 151 maintains balance while performing an action. At step 500, the humanoid robot 151 is placed in predefined static positions on a set of force sensor plates. Doing so provides experimental data for estimating inertial parameters of the humanoid robot 151. In some embodiments, the predefined positions may include a variety of static standing and squatting positions. Further, while in each predefined standing and squatting position, the CoM of the humanoid robot 151 may be above the feet of the humanoid robot 151, allowing it to maintain its balance without external support.

In one embodiment, the set of force sensor plates may include two force sensor plates, one of which is placed beneath the left foot of the humanoid robot and the other of which is placed beneath the right foot of the humanoid robot. Further, the force sensor plates may measure six-axis contact forces exerted by the humanoid robot 151 in the predefined static positions.

At step 510, a computer stores contact forces measured by the set of force sensor plates. The computer further stores torques exerted on the joints of the robot, as measured by load cells in the humanoid robot 151. In one embodiment, the load cell measurements include only torque measurements for joints that are modeled in a reduced 2D model of the robot. For example, the 2D model may include torso, hip, knee, and ankle joints, and measurements may be read and stored only for the torso, hip, knee, and ankle joints of the humanoid robot 151.

In one embodiment, a first set of the data collected at step 510 is used for training and a second set of the data collected at step 510 is used for evaluation. Specifically, for each evaluation position, an error between the predicted CoM positions based on the training and the actual data for the center-of-pressure positions can be obtained using any technically feasible manner, including the root-mean-square error technique.

At step 520, a human determines a set of inertial parameters that are relevant to the action. In one embodiment, the action is a sit-to-stand action, and the relevant inertial parameters may be based on a projection of the links of the humanoid robot 151 onto a sagittal plane of the humanoid robot 151. In such a case, the human may determine that the arms of the humanoid robot 151 may be discarded, and the CoM estimate may be based on a 5-link model with the following four degrees of freedom: ankle, knee, hip, and torso. That is, the inertial parameters for the humanoid robot 151 are reduced to the inertial parameters for the five links, giving a total of fifteen inertial parameters representing the masses, x positions, and y positions of the five links.

At step 530, a computer estimates the set of relevant inertial parameters, determined at step 520, based on the contact forces and joint torques data recorded at step 510. The complete dynamics equations of a floating base rigid body robot can be written to be linear with respect to inertial parameters:

$$K(q,\dot{q},\ddot{q})\phi = S^T\tau + J_C^T(q)\lambda, \quad (3)$$

where $q \in \mathbb{R}^{n+6}$ is the robot configuration vector for a robot with n joints and a six degree-of-freedom floating base, $\tau \in \mathbb{R}^n$ is the vector of actuation torques, where $S^T = [0_{n \times 6} \ I_{n \times n}]$ delineates the actuated and unactuated degrees-of-freedom, $J_C$ is the contact Jacobian, $\lambda$ is the vector of contact forces, and $\phi = [\phi_0^T \phi_1^T \dots \phi_n^T]^T$ is the vector of inertial parameters of n+1 links (n joints plus the floating base link), where each link has the following twelve inertial parameters:

$$\phi_{g,i} = [m_i \ m_i c_{x_i} \ m_i c_{z_i} \ I_{xx_i} \ I_{xy_i} \ I_{xz_i} \ I_{yy_i} \ I_{yz_i} \ I_{zz_i} \ f_{c_i} \ f_{v_i}]^T, \quad (4)$$

where $m_i$ is the mass of link i, the vector $\langle c_{x_i} c_{y_i} c_{z_i} \rangle$ is the CoM position of link i, $\langle I_{xx_i} I_{xy_i} I_{xz_i} I_{yy_i} I_{yz_i} I_{zz_i} \rangle$ are the 6 independent components of the inertia tensor of link i, and $f_{c_i}$ and $f_{v_i}$ are coulomb and viscous friction, respectively. By considering only static postures of the robot (i.e., when $\dot{q} = \ddot{q} = 0$ in equation 3) and by considering only the gravity contribution of K, equation 3 may be simplified to:

$$K_g(q)\phi_g = S^T\tau + J_C^T(q)\lambda, \quad (5)$$

With the parameters of each link may be defined as $$\phi_{g,i} = [m_i \ m_i c_{x_i} \ m_i c_{y_i} \ m_i c_{z_i}]^T \quad (6)$$

Further, for a set of contact forces and torques of a humanoid robot in various static positions, the data may be stacked as follows:

$$\begin{bmatrix} K_g(q_1) \\ K_g(q_2) \\ \vdots \\ K_g(q_N) \end{bmatrix} \phi_g = \begin{bmatrix} S^T\tau_1 + J_{C_1}^T \lambda_1 \\ S^T\tau_2 + J_{C_2}^T(q)\lambda_2 \\ \vdots \\ S^T\tau_N + J_{C_N}^T(q)\lambda_N \end{bmatrix}, \quad (7)$$

or in more simple notation as:

$$\bar{K}_g \phi_g = \bar{f}, \quad (8)$$

where the bar notation refers to an augmented stack of N matrices, and the following vector of total generalized force:

$$f_i = S^T \tau_i + J_{C_i}^T \lambda_i, \qquad (9)$$

Based on this simplification, the computer may calculate the weighted least-squares optimization of the inertial parameters by inserting the contact force and torque data into the right-hand side of the following equation:

$$\hat{\phi}_g = (\bar{K}_g^T \bar{K}_g)^{-1} \bar{K}_g^T \bar{f} \qquad (10)$$

which computes the parameter set $\hat{\phi}_g$ that minimizes $\|\bar{K}_g \hat{\phi}_g - \bar{f}\|_2$.

Finally, at step 540, the computer calculates an estimate of the total CoM of the humanoid robot via forward kinematics using the masses and relative CoM locations of each modeled link. Specifically, the computer may calculate the masses and relative CoM locations for a given pose of the humanoid robot using the inertial parameters estimated at step 530.

Figure 6:
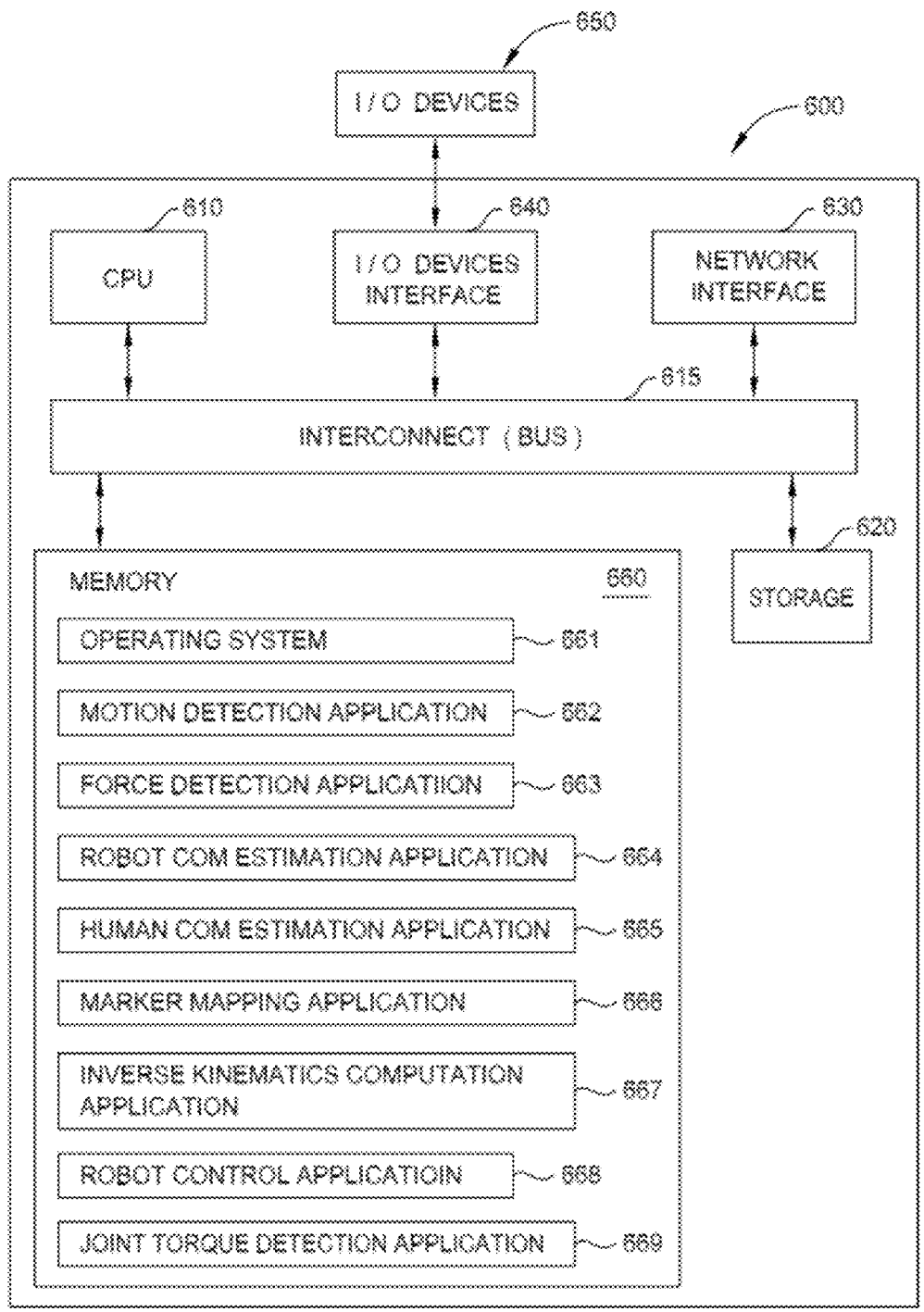
FIG. 6 depicts a block diagram of a system in which embodiments of the invention may be implemented.

FIG. 6 illustrates an example of a system 600 in which embodiments of the invention may be implemented. As shown, the system 600 includes, without limitation, a central processing unit (CPU) 610, a network interface 630, an interconnect 615, a memory 660 and storage 620. The system 600 may also include an I/O device interface 640 connecting I/O devices 650 (e.g., keyboard, display and mouse devices) to the system 600. The I/O devices 640 and 650 may include a controller capable of configuring the articulated link positions of a humanoid robot 151 by modifying the angles of joints of the humanoid robot 151.

The CPU 610 retrieves and executes programming instructions stored in the memory 660. Similarly, the CPU 610 stores and retrieves application data residing in the memory 660. The interconnect 615 facilitates transmission, such as of programming instructions and application data, between the CPU 610, I/O device interface 640, storage 620, network interface 630, and memory 660. CPU 610 is included to be representative of a single CPU, multiple CPUs, a single CPU having multiple processing cores, and the like. And the memory 660 is generally included to be representative of a random access memory. The storage 620 may be a disk drive storage device. Although shown as a single unit, the storage 620 may be a combination of fixed and/or removable storage devices, such as fixed disc drives, floppy disc drives, tape drives, removable memory cards or optical storage, network attached storage (NAS), or a storage area-network (SAN). Further, system 600 is included to be representative of a physical computing system as well as virtual machine instances hosted on a set of underlying physical computing systems. Further still, although shown as a single computing system, one of ordinary skill in the art will recognized that the components of the system 600 shown in FIG. 6 may be distributed across multiple computing systems connected by a data communications network. Also, the functions of controlling the joint articulation of a robot may be separate from the systems and applications described herein used to derive a solution for the robot to reproduce a designated motion (e.g., a sit-to-stand motion), and are included in system 600 for convenience of description.

As shown, the memory 660 includes an operating system 661 and applications 662-669. Illustratively, the operating system may include Microsoft's Windows®. The applications 662-669 include a motion detection application 662, which is configured to help receive and store data pertaining to the motions of the human demonstrator 101 and/or the humanoid robot 151. For example, a set of video recorders may record and transmit the data to the motion detection application 662, which may cause the data to be stored in the storage device 620. In some embodiments, the data may include positions of markers placed on the human demonstrator 101 and/or the humanoid robot 151. The applications 662-669 further include a force detection application 663, which is configured to help receive and store data pertaining to contact forces. For example, a set of force sensor plates may transmit the data to the force detection application 663, which may cause the data to be stored in the storage device 620. The applications 662-669 further include a torque detection application 669, which is configured to receive and store torque data pertaining to the torques experienced and exerted by the joints of the humanoid robot 151. For example, a set of load cells within the humanoid robot 151 may transmit joint torque data measured by the load cells to the force detection application 662, which may cause the data to be stored in the storage device 620. The applications 662-669 further include a robot CoM estimation application 664, which is configured to estimate the CoM of the humanoid robot 151 based on data received and stored by the torque detection application 669 and the force detection application 663.

In one embodiment, the robot COM estimation application 664 is configured to solve a simplified version of the traditional least-squares optimization inertial parameter identification problem, as described in detail above with respect to FIG. 5. The applications 662-669 further include a human CoM estimation application 665, which is configured to determine the CoM of a human skeletal model with variable link lengths and masses, as described in detail above with respect to FIG. 3. The applications 662-669 further include a marker mapping application 666, which is configured to map one set of markers to another. For example, markers placed on the human demonstrator 101 may be mapped to markers placed on the humanoid robot 151. The applications 662-669 further include an inverse-kinematics computation application 667, which is configured to iteratively solve an inverse kinematics problem, as described in detail above with respect to FIG. 2. The applications 662-669 further include a robot control application 663, which may be configured to send signals to the humanoid robot 151 indicating the joint movements to be made in performing the action based on the human demonstration. That is, the robot control application 663 may convert the results of a solution to an inverse kinematics problem, provided by the inverse-kinematics computation application 667, to instructions that are sent to the humanoid robot 151, thereby causing the humanoid robot 151 to move according to those instructions.

Advantageously, embodiments of the invention allow a humanoid robot 151 to maintain balance while performing various anthropomorphic actions. Such actions include sit-to-stand actions, as well as certain upper-body movements. Because the humanoid robot 151 can maintain balance, the feet of the humanoid robot 151 need not be bolted to the floor. As a result, the robot may move about and interact with its environment rather than remaining fixed at one location.

While the foregoing is directed to embodiments of the present invention, other and further embodiments of the invention may be devised without departing from the basic scope thereof, and the scope thereof is determined by the claims that follow.

What is claimed is:

1. A method for reproducing a designated action of a human with a robot, comprising:
   receiving motion capture data and contact force data obtained from the human performing the designated action;

approximating, from the contact force data and the motion capture data, a center of mass (CoM) trajectory of the human in performing the designated action; and generating, via one or more processors, a planned robot action for emulating the designated action, wherein generating the planned robot action comprises solving an inverse kinematics problem having the approximated human CoM trajectory as a hard constraint and the motion capture data as a soft constraint to determine a plurality of joint angle trajectories for a corresponding plurality of joints of the robot.

2. The method of claim 1, wherein the designated action is a sit-to-stand action.

3. The method of claim 1, wherein the inverse kinematics problem further has constraints relative to at least one of matching torques, smoothness, energy efficiency, or collision avoidance in performing the designated action.

4. The method of claim 1, wherein the motion capture data provides trajectories of a plurality of markers placed on the human, and wherein the contact force data represents forces exerted by the human on one or more force sensor plates in performing the designated action.

5. The method of claim 4, wherein approximating the CoM trajectory of the human action comprises:
determining, based on the recorded contact forces, a center of pressure (CoP) trajectory of the human in performing the designated action;
mapping the markers to joint angle data of a human skeletal model;
scaling one or more of a length and mass of a link of the human skeletal model so that the CoP trajectory of the human skeletal model in performing a simulation of the designated action matches, up to a predefined error tolerance, the CoP trajectory of the human in performing the designated action; and
determining a CoM trajectory for the scaled skeletal model in performing the simulation of the designated action.

6. The method of claim 1, wherein generating the planned robot action further comprises estimating a set of inertial parameters of the robot, wherein estimating the set of inertial parameters comprises:
placing the robot in a plurality of static positions;
determining contact forces and joint torques of the robot in each static position; and
estimating the set of inertial parameters based on the determined contact forces and joint torques.

7. The method of claim 6, wherein the plurality of static positions comprise one or more of a standing position and a squatting position.

8. The method of claim 6, wherein estimating a set of inertial parameters comprises solving a weighted least squares problem.

9. The method of claim 6, wherein the set of inertial parameters is a reduced set of inertial parameters that is relevant to the action.

10. The method of claim 9, wherein the reduced set of inertial parameters comprises inertial parameters for a reduced model of the robot with motion restricted to a sagittal plane of the robot.

11. The method of claim 10, wherein the reduced model of the robot is a model comprising the following degrees of freedom: ankle, knee, hip, and torso.

12. A non-transitory computer readable storage medium comprising a program product which, when executed by a processor is configured to perform an operation for reproducing a designated action of a human with a robot, the operation comprising:

receiving motion capture data and contact force data obtained from the human performing the designated action;

approximating, from the contact force data and the motion capture data, a center of mass (CoM) trajectory of the human in performing the designated action; and generating a planned robot action for emulating the designated action, wherein generating the planned robot action comprises solving an inverse kinematics problem having the approximated human CoM trajectory as a hard constraint and the motion capture data as a soft constraint to determine a plurality of joint angle trajectories for a corresponding plurality of joints of the robot.

13. The computer readable storage medium of claim 12, wherein the action is a sit-to-stand action.

14. The computer readable storage medium of claim 12, wherein the inverse kinematics problem further has constraints relative to at least one of matching torques, smoothness, energy efficiency, or collision avoidance in performing the designated action.

15. The computer readable storage medium of claim 12, wherein the motion capture data provides trajectories of a plurality of markers placed on the human, and wherein the contact force data represents forces exerted by the human on one or more force sensor plates in performing the designated action.

16. The computer readable storage medium of claim 15, wherein approximating the CoM trajectory of the human in performing the action comprises:
determining, based on the recorded contact forces, a center of pressure (CoP) trajectory of the human in performing the designated action;
mapping the markers to joint angle data of a human skeletal model;
scaling one or more of a length and mass of a link of the human skeletal model so that the CoP trajectory of the human skeletal model in performing a simulation of the designated action matches, up to a predefined error tolerance, the CoP trajectory of the human in performing the designated action; and
determining a CoM trajectory for the scaled skeletal model in performing the simulation of the designated action.

17. The computer-readable storage medium of claim 12, wherein generating the planned robot action further comprises estimating a set of inertial parameters of the robot, wherein estimating the set of inertial parameters comprises:
placing the robot in a plurality of static positions;
determining contact forces and joint torques of the robot in each static position; and
estimating the set of inertial parameters based on the determined contact forces and joint torques.

18. The computer readable storage medium of claim 17, wherein the set of inertial parameters is a reduced set of inertial parameters that is relevant to the action.

19. The computer readable storage medium of claim 18, wherein the reduced set of inertial parameters comprises inertial parameters for a reduced model of the robot with motion restricted to a sagittal plane of the robot.

20. A system, comprising:
a memory comprising a program; and
a processor which, when executing the program, is configured to:
receive motion capture data and contact force data obtained from a human performing a designated action;

approximate, from the contact force data and the motion capture data, a center of mass (CoM) trajectory of the human in performing the designated action; and generate a planned robot action for emulating the designated action, wherein generating the planned robot action comprises solving an inverse kinematics problem having the approximated human CoM trajectory as a hard constraint and the motion capture data as a soft constraint to determine a plurality of joint angle trajectories for a corresponding plurality of joints of the robot.

21. The system of claim 20, wherein approximating the CoM trajectory of the human in performing the action comprises:

determining, based on the recorded contact forces, a center of pressure (CoP) trajectory of the human in performing the designated action;

mapping markers placed on the human to joint angle data of a human skeletal model;

scaling one or more of a length and mass of a link of the human skeletal model so that the CoP trajectory of the human skeletal model in performing a simulation of the designated action matches, up to a predefined error tolerance, the CoP trajectory of the human in performing the designated action; and determining a CoM trajectory for the scaled skeletal model in performing the simulation of the designated action.

22. The system of claim 20, wherein generating the planned robot action further comprises estimating a set of inertial parameters of the robot, wherein estimating the set of inertial parameters comprises:

placing the robot in a plurality of static positions;

determining contact forces and joint torques of the robot in each static position; and estimating the set of inertial parameters based on the determined contact forces and joint torques.

23. The system of claim 22, wherein the set of inertial parameters is a reduced set of inertial parameters that is relevant to the action.

24. The system of claim 23, wherein the reduced set of inertial parameters comprises inertial parameters for a reduced model of the robot with motion restricted to a sagittal plane of the robot.

25. A method for reproducing a designated action of a human with a robot, comprising:

receiving motion capture data and contact force data obtained from the human performing the designated action, wherein the motion capture data comprises trajectories of a set of markers placed on the human;

approximating, from the contact force data and the motion capture data, a center of mass (CoM) trajectory of the human in performing the designated action; and reproducing the designated action by:
generating, via one or more processors, a planned robot action for emulating the designated action, wherein generating the planned robot action comprises solving an inverse kinematics problem having the approximated human CoM trajectory as a hard constraint and the motion capture data as a soft constraint to determine a plurality of joint angle trajectories for a corresponding plurality of joints of the robot; and sending the joint angle trajectories to a set of joint controllers of the robot to cause the robot to perform the designated action.

\* \* \* \* \*

UNITED STATES PATENT AND TRADEMARK OFFICE
CERTIFICATE OF CORRECTION

PATENT NO. : 9,162,720 B2
APPLICATION NO. : 13/311419
DATED : October 20, 2015
INVENTOR(S) : Mistry et al.

It is certified that error appears in the above-identified patent and that said Letters Patent is hereby corrected as shown below:

In the specification

Column 8, Line 30, please delete "$\hat{\phi}_g = (K_g{}^T K_g)^{-1} K_g{}^T f$" and insert -- $\hat{\phi}_g = \left(\overline{K}_g^T \overline{K}_g\right)^{-1} \overline{K}_g^T \overline{f}$ -- therefor;

Column 8, Line 33, please delete "$\phi_g = [m_i \ m_i c_{x_i} \ m_i c_{y_i} \ m_i c_{z_i}]^T$" and insert -- $\phi_{g,i} = [m_i \ m_i c_{x_i} \ m_i c_{y_i} \ m_i c_{z_i}]^T$ -- therefor;

Column 8, Line 48, please delete "$J_{C_N}{}^T$" and insert -- $J_{C_N}^T$ -- therefor;

Column 9, Line 12, please delete "$J_{CoM}(\theta_r) \in \mathbb{R}^{3n_m \times n_{jr}}$" and insert -- $J_m(\theta_r) \in \mathbb{R}^{3n_m \times n_{jr}}$ -- therefor;

Column 12, Line 30, please delete "$K(q,\dot{q},\ddot{q})\phi = S^T \tau + J_C{}^T(q)\lambda$" and insert -- $K(q,\dot{q},\ddot{q})\phi = S^T \tau + J_C^T(q)\lambda$ -- therefor;

Signed and Sealed this
Twenty-third Day of February, 2016

Michelle K. Lee
*Director of the United States Patent and Trademark Office*

CERTIFICATE OF CORRECTION (continued)
U.S. Pat. No. 9,162,720 B2

In the specification

Column 12, Line 36, please delete "$\phi = [\phi_0{}^T \phi_1{}^T \cdots \phi_n{}^T]^T$" and insert -- $\phi = [\phi_0^T \quad \phi_1^T \quad \cdots \quad \phi_n^T]^T$ -- therefor;

Column 12, Line 40, please delete "$\phi_{g,i} = [m_i \; m_i^c{}_{x_i} \; m_i c_{z_i} I_{xx_i} I_{xy_i} I_{xz_i} I_{yy_i} I_{yz_i} I_{zz_i} f_{c_i} f_{v_i}]^T,$" and insert -- $\phi_{g,i} = [m_i \; m_i c_{x_i} \; m_i c_{y_i} \; m_i c_{z_i} \; I_{xx_i} \; I_{xy_i} \; I_{xz_i} \; I_{yy_i} \; I_{yz_i} \; I_{zz_i} \; f_{c_i} \; f_{v_i}]^T,$ -- therefor;

Column 12, Line 49, please delete "$K_g(q)\phi_g = S^T\tau + J_C^T(q)\lambda,$" and insert -- $K_g(q)\phi_g = S^T\tau + J_C^T(q)\lambda$ -- therefor;

Column 13, Line 4, please delete "$f_i = S^T\tau_i + J_{C_i}{}^T\lambda_i,$" and insert -- $f_i = S^T\tau_i + J_{C_i}^T\lambda_i,$ -- therefor;

Column 13, Line 10, please delete "$\hat{\phi}_g = (\overline{K}_g{}^T\overline{K}_g)^{-1}\overline{K}_g{}^T\overline{f}$" and insert -- $\hat{\phi}_g = \left(\overline{K}_g^T \overline{K}_g\right)^{-1} \overline{K}_g^T \overline{f}$ -- therefor.